United States Patent
Clossen-von Lanken Schulz et al.

(10) Patent No.: US 12,013,316 B2
(45) Date of Patent: Jun. 18, 2024

(54) METHOD AND DEVICE FOR TAKING A SAMPLE, AND USE OF A DEVICE OF THIS TYPE

(71) Applicant: Siemens Energy Global GmbH & Co. KG, Munich (DE)

(72) Inventors: Michael Clossen-von Lanken Schulz, Issum (DE); Markus Legenbauer, Essen (DE); Dennis Schlüter, Hamminkeln (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 840 days.

(21) Appl. No.: 16/980,382

(22) PCT Filed: Mar. 12, 2019

(86) PCT No.: PCT/EP2019/056166
§ 371 (c)(1),
(2) Date: Sep. 12, 2020

(87) PCT Pub. No.: WO2019/179828
PCT Pub. Date: Sep. 26, 2019

(65) Prior Publication Data
US 2021/0041330 A1    Feb. 11, 2021

(30) Foreign Application Priority Data
Mar. 22, 2018 (DE) ................... 10 2018 204 402.3

(51) Int. Cl.
*G01N 1/04* (2006.01)
*B26D 1/00* (2006.01)
(Continued)

(52) U.S. Cl.
CPC ............... *G01N 1/04* (2013.01); *B26D 5/007* (2013.01); *B26D 2001/002* (2013.01);
(Continued)

(58) Field of Classification Search
CPC ............ G01N 1/04; B26D 5/007; B26D 3/11; B26D 5/086; B26D 2001/002; B28D 1/30
(Continued)

(56) References Cited

U.S. PATENT DOCUMENTS

| 4,845,896 A | * | 7/1989 | Mercaldi | ................. | B26D 1/44 |
| | | | | | 451/280 |
| 5,984,766 A | * | 11/1999 | Gilmour | .................. | G01N 1/04 |
| | | | | | 83/327 |

(Continued)

FOREIGN PATENT DOCUMENTS

| CN | 1457968 A | | 11/2003 |
| CN | 1457968 A | * | 11/2003 |

(Continued)

OTHER PUBLICATIONS

PCT International Search Report and Written Opinion of International Searching Authority dated Jun. 24, 2019 corresponding to PCT International Application No. PCT/EP2019/056166 filed Mar. 12, 2019.

*Primary Examiner* — Stephanie E Bloss
*Assistant Examiner* — Kevin C Butler

(57) ABSTRACT

A device for taking a sample from a solid body by cutting out, having a frame and a cutting tool retained on the frame in such a way that the cutting tool can be moved relative to the frame, wherein the cutting tool, at least in parts, at least substantially has the shape of a hollow spherical cap or a hollow spherical segment. A method for taking a sample from a solid body by cutting out is implemented with the device.

20 Claims, 6 Drawing Sheets

(51) Int. Cl.
  *B26D 3/11* (2006.01)
  *B26D 5/00* (2006.01)
  *B26D 5/08* (2006.01)
  *B28D 1/30* (2006.01)

(52) U.S. Cl.
  CPC ................ *B26D 3/11* (2013.01); *B26D 5/086* (2013.01); *B28D 1/30* (2013.01)

(58) Field of Classification Search
  USPC ...................................................... 73/864.41
  See application file for complete search history.

(56) References Cited

U.S. PATENT DOCUMENTS

| | | | | |
|---|---|---|---|---|
| RE41,737 E | * | 9/2010 | Leem | H04B 1/7083 |
| | | | | 370/335 |
| 8,393,836 B2 | * | 3/2013 | Wang | B23Q 15/22 |
| | | | | 409/16 |
| 9,017,147 B2 | * | 4/2015 | Vindler | B26D 1/44 |
| | | | | 451/236 |
| 10,843,278 B2 | * | 11/2020 | Garza, Jr. | B23C 3/04 |
| 2012/0266733 A1 | * | 10/2012 | Vindler | B26D 3/10 |
| | | | | 83/861 |
| 2021/0041330 A1 | * | 2/2021 | Clossen-von Lanken Schulz | ...... |
| | | | | B26D 1/44 |

FOREIGN PATENT DOCUMENTS

| | | | | | |
|---|---|---|---|---|---|
| CN | 106353123 A | | 1/2017 | | |
| CN | 106353123 A | * | 1/2017 | | |
| DE | 102006054617 A1 | * | 5/2008 | ........... | B23D 45/003 |
| DE | 102018204402 A1 | * | 9/2019 | ............ | B23D 61/00 |
| GB | 1282778 A | * | 7/1972 | | |
| GB | 2282778 A | | 4/1995 | | |
| GB | 2282778 A | * | 4/1995 | | |
| GB | 2307432 A | * | 5/1997 | | |
| JP | 01267433 A | * | 10/1989 | | |
| JP | H01267433 A | | 10/1989 | | |
| JP | 2663494 B2 | * | 10/1997 | | |
| JP | 3159924 U | * | 6/2010 | | |
| JP | 2011161540 A | * | 8/2011 | | |
| JP | 5123636 B2 | * | 1/2013 | ........... | B23D 45/003 |
| JP | 2015503731 A | * | 2/2015 | ............... | G01N 1/06 |
| JP | 2018147913 | * | 9/2018 | ........... | H01L 21/304 |
| KR | 2018100497 A | * | 9/2018 | | |

\* cited by examiner

METHOD AND DEVICE FOR TAKING A SAMPLE, AND USE OF A DEVICE OF THIS TYPE

CROSS REFERENCE TO RELATED APPLICATIONS

This application is the US National Stage of International Application No. PCT/EP2019/056166 filed 12 Mar. 2019, and claims the benefit thereof. The International Application claims the benefit of German Application No. DE 10 2018 204 402.3 filed 22 Mar. 2018. All of the applications are incorporated by reference herein in their entirety.

FIELD OF INVENTION

The invention relates to a device for taking a sample from a solid body by cutting out, and to the use of a device of this type. Furthermore, the invention relates to a method for taking a sample from a solid body by cutting out.

BACKGROUND OF INVENTION

The applicant knows that samples are taken from solid bodies, which, for example, can be components of a gas turbine which have been in operation or else any other desired components or bodies, in order subsequently to analyze said samples. Purely by way of example, the removal of a sample from a metallic solid body for subsequent metallographic analysis may be mentioned.

Samples can be obtained from a solid body by a generally comparatively small part of the body to be examined being severed, for example by cutting from the remaining section. The sample obtained can then be subjected to an analysis.

In order that a sample taken by cutting is representative, in particular reflects the actual condition of the component to be examined, structural changes, for example as a consequence of thermal impairment by the separation process during the taking of the sample, are impermissible.

SUMMARY OF INVENTION

It is therefore an object of the present invention to specify a device for taking a sample from a solid body with which a sample that is representative, in particular not influenced or influenced as little as possible by the removal process, can be taken in a comparatively simple way and rapidly.

This object is achieved by a device for taking a sample from a solid body by cutting out, comprising a frame and a cutting tool held on the frame in such a way that that cutting tool can be moved relative to the frame, wherein the cutting tool, at least in parts, at least substantially has the shape of a hollow spherical layer or a hollow spherical segment.

The applicant has established that a cutting tool which has the shape of a segment or a layer of a hollow sphere is excellently well suited to take samples from, for example, metallic solid bodies simply and rapidly, wherein, because of the specific shape of the cutting tools, structural changes, for example as a consequence of thermal action, can be avoided or kept to a minimum.

The cutting tool according to the invention can be driven into a solid body virtually like a three-dimensional circular saw to take the sample, a spherical cutting contour being obtained. This has proven to be a particularly suitable and structure-maintaining separation process.

Here, a hollow spherical segment is to be understood conventionally as a shape which is obtained when a hollow sphere, which can also be designated as a spherical shell, is cut from a plane. A hollow spherical layer is that shape which results between two parallel planes which intersect a hollow sphere.

The cutting tool can, for example, be plate-shaped in a central region, in particular for a suitable fixing to a tool holder, and the plate-shaped section is adjoined by a section which has the shape of a hollow spherical layer forms the blade.

The cutting tool of the device according to the invention is expediently mounted such that it can rotate about a tool axis of rotation in order to carry out a cutting movement. The tool axis of rotation in particular coincides with that axis which is rotationally symmetrical in relation to that of the hollow spherical segment-shaped or hollow spherical disc-shaped cutting tool or the hollow spherical segment-shaped or hollow spherical disc-shaped section of the cutting tool.

The cutting tool is also, advantageously at least in parts, coated with cubic boron nitride, in particular to increase the resistance to wear.

In a further particularly advantageous embodiment, the cutting tool has a multiplicity of recesses which, in particular, extend radially inwards from its outer circumference and/or are advantageously distributed along its outer circumference and advantageously displaced equidistantly from one another. The recesses which, for example, can have a U-shaped contour, are used in particular for improved chip evacuation during a cutting operation.

To carry out the rotational movement of the cutting tool about the tool axis of rotation, a rotary drive unit is advantageously provided. In a refinement, this can comprise a spindle and/or a brushless DC motor. The motorized drive of the rotational movement of the cutting tool also advantageously meets the requirements of protection class III according to DIN EN 61140, is therefore advantageously provided by a drive with a safety extra-low voltage.

In a further particularly advantageous refinement, the arrangement is further made such that the position of the tool axis of rotation relative to the frame can be varied.

The arrangement is in particular made in such a way that the cutting tool can be moved on a spherical surface, the radius of which advantageously corresponds to a spherical radius that belongs to the hollow spherical segment-shaped or hollow spherical disc-shaped cutting tool or hollow spherical segment-shaped or hollow spherical disc-shaped section of the cutting tool. A hollow spherical segment defines an inner and outer radius, wherein both radii can be used equally. The cutting tool can in particular be moved with 2° of freedom on the spherical surface.

A two-axis feed movement on a spherical surface is then possible, for example both in the horizontal and in the vertical direction. As a result of a two-axis feed movement, in particular a constant chip volume over the entire sample cross section can be maintained with a virtually negligible input of heat into the sample.

In order to carry out a feed movement about a feed axis that is advantageously stationary in relation to the frame, the cutting tool is pivotably mounted on the frame. Alternatively or additionally, to carry out a stroke movement about a stroke axis which is orthogonal to the feed movement or variable in its position relative to the frame, the cutting tool is pivotably mounted on the frame. In addition, the cutting tool can be vertically adjustably mounted on the frame.

In a particularly advantageous refinement, the feed axis and the stroke axis intersect at the spherical centre belonging to the hollow spherical segment-shaped or hollow spherical disc-shaped cutting tool or the hollow spherical segment-shaped or hollow spherical disc-shaped section of the cutting tool. A defined spherical centre, to which reference can be made, belongs to every hollow spherical segment and every hollow spherical layer of a given size.

The feed axis can, for example, be oriented vertically, while the stroke axis is distinguished by a position which is advantageously variable but always located in the horizontal plane.

For the rotational movement of the cutting tool about the feed axis, a feed drive unit, in particular having a stepping motor and/or a worm gear mechanism, can be provided.

In an analogous way, for the pivoting movement of the cutting tool about the stroke axis, a stroke drive unit, in particular having a linear drive advantageously comprising a stepping motor and/or a planetary gear mechanism can be provided. The stroke drive unit then advantageously comprises an actuating element which can be moved in and out linearly, which is connected in an articulated manner to a tool holder carrying the cutting tool, wherein the actuating element is advantageously mounted such that it can pivot about a stroke drive pivot axis. Provision can also be made for the stroke drive unit comprising the actuating element to be mounted such that it can pivot about a stroke drive pivot axis.

A drive for the pivoting movement of the cutting tool about the feed axis and/or a drive for the pivoting movement about the stroke axis, also meet the requirements according to protection class III according to DIN EN 61140. Particularly advantageously, the safety extra-low voltage is logically used for all the drives and feeds.

Furthermore, for taking a sample, for example in the turbine area, a cutting tool has proven to be particularly advantageous of the size of which the radius which belongs to the hollow spherical segment-shaped or hollow spherical disc-shaped cutting tool or the hollow spherical segment-shaped or hollow spherical disc-shaped section lies in the range from 40 mm to 100 mm, in particular 50 mm to 80 mm, particularly advantageously 65 mm to 75 mm. The maximum diameter of the hollow spherical segment-shaped or hollow spherical disc-shaped cutting tool or of the hollow spherical segment-shaped or hollow segment-disc-shaped section of the latter advantageously lies below 100 mm.

In a further embodiment, the device according to the invention has a holding body, on which the cutting tool is movably held. If a holding body is provided, in order to implement the feed movement about the feed axis, which advantageously coincides with a central longitudinal axis of the holding body, said holding body can be rotatably mounted on the frame of the device, which has proven to be a particularly suitable design implementation. The cutting tool can alternatively or additionally be mounted on the holding body so as to be pivotable about the stroke axis, in order to permit the stroke movement. The holding body can additionally be vertically adjustably mounted on the frame, so that the height of the cutting tool is adjustable.

The holding body can, for example, have a advantageously at least substantially cylindrical drive section, which is mounted on the frame so as to be rotatable about its central longitudinal axis. Alternatively or additionally, the drive section can be provided with teeth on the outside, some of which mesh with a motor-driven worm mounted on the housing so as to be rotatable about its longitudinal axis. In this case, the advantageously cylindrical drive section forms the worm wheel of a worm gear mechanism, which is set rotating when the screw-like or spindle-like worm of the worm gear mechanism is rotated about its longitudinal axis by a motor.

Also alternatively or additionally, the holding body can comprise a receiving section, which is distinguished by an at least partly outer and/or inner contour, particularly advantageously by a spherical outer and inner contour in the manner of a hollow spherical segment. A tool holder carrying the cutting tool and/or a drive for the rotational movement of the cutting tool about the tool axis of rotation is then advantageously arranged in the receiving section. The receiving section can have an opening, and the cutting tool is then advantageously arranged in the region of the opening.

In order to be able to temporarily fix the device according to the invention particularly conveniently and reliably to a solid body to take a sample, said device can have feet, for example three feet, which advantageously comprise magnets that can be switched on and off. Alternatively or additionally, for the case in which samples are to be taken from paramagnetic materials, provision can be made for the feet and/or the frame to have receptacles for tension belts. More advantageously, the feet are connected to the frame of the device in an articulated manner, in particular via radial joint bearings.

The feet can be fixed to the frame so as to be rotatable in and out, which means that vertical adjustability of the frame and thus of the cutting tool held thereon can be achieved.

In a development of the device, a housing open on one side is provided. Alternatively or additionally, the device can comprise a suction unit or a connection via which in particular the housing section can be connected to a suction unit. Chips arising as a result of the cutting process can be removed reliably via a suction unit. For example, the housing can be provided with an in particular lateral connection, which can be connected to a hose of a suction device.

If there is a housing, this is advantageously configured in such a way that it encompasses or encloses, therefore encapsulates, a machining region provided in particular on the underside of the device. An encapsulated design—in particular in combination with a suction unit—permits particularly clean sample taking, so that the device according to the invention is, for example, also suitable for use in a clean room.

Particularly advantageously, the device according to the invention comprises a frame and/or housing produced via a rapid prototyping method, in particular from plastic.

In a further refinement of the device according to the invention, a control unit, which advantageously comprises at least one microprocessor, is provided. The control unit is in particular connected to a drive for the rotational movement of the cutting tool about the tool axis of rotation and/or a drive for the pivoting movement of the cutting tool about the stroke axis and/or a drive for the rotational movement of the holding body about the feed axis, particularly advantageously to all three drives. It is also particularly advantageously formed and configured in such a way that a sample can be taken fully automatically from a solid body, this expediently after the device has been arranged as intended on a solid body for a sample to be taken and advantageously temporarily fixed—for example by hand and/or by using suitable aids.

The fully automated configuration in particular permits the taking of samples even at inaccessible points. Following the positioning of the device, this can be controlled autonomously to start the taking of samples.

In a development, the device according to the invention comprises one or more sensors, in particular for monitoring external parameters and/or states of drives that are present.

If one or more sensors are present, this or these can, for example, be that or those designed to measure the temperature, the emission of sound, current consumption and/or rotational speed of motors that are present.

If one or more sensors are present, these are advantageously connected to a control unit of the device according to the invention, so that the sensors can transmit acquired measured values thereto, continuously or repeatedly at predefined time intervals. The control unit can then be designed to analyze measured values that are obtained and, on the basis of these, to determine optimal process parameters which in turn are fed back, for example to existing drives, in particular in order to control the cutting, therefore removal, operation accordingly ideally.

In addition, at least one camera can be provided, to be able to observe a sample-taking process—even from a distance.

Also advantageously, the device comprises one or more encoders, i.e. displacement transducers, which is/are designed and arranged to measure the current position of the cutting tool. If multiple drives are provided for a movement of the cutting tool, at least one encoder is advantageously provided for each drive and assigned to the respective drive. The use of encoders, via which the position, in particular of all the axes, can be detected permits, amongst other things, repeated tracing of any desired contours.

It has transpired that, by using the device according to the invention, the input of heat occurring within the context of taking a sample from a solid body is so low that cooling is not absolutely necessary. In order nevertheless to have the possibility of such cooling, in a development the device according to the invention can comprise means for cooling, for example means for supplying a cooling medium.

The device according to the invention has proven to be particularly suitable to take samples within the context of a turbine service or turbine inspection. The samples taken can then be used, for example, to determine material properties or material damage, such as cracks. Alternatively or additionally, the samples can also be used in tensile tests, creep tests or other tests, via which the material properties can be determined following the operation of the materials, that is to say in particular following thermal and/or mechanical loadings.

A further subject of the present invention is a method for taking a sample from a solid body by cutting out, in which—a device as claimed, —the device is arranged at a suitable point on the solid body and in particular temporarily fixed, and—a sample is taken from the solid body by means of the cutting tool, wherein a section having a spherical segment-shaped contour in the solid body is produced.

While carrying out the method according to the invention by using the device according to the invention, representative solid body samples which are particularly suitable for further analysis and condition determination can be obtained comparatively simply and comparatively rapidly.

Finally, the invention relates to the use of a device according to the invention for taking a sample from a solid body by cutting out. A solid body from which a sample is taken can be, for example, components of a gas turbine that have been in operation or else any other desired components or bodies.

BRIEF DESCRIPTION OF THE DRAWINGS

Further features and advantages of the present invention will become clear from the following description of three embodiments of a device according to the invention, with reference to the appended drawing, in which.

DETAILED DESCRIPTION OF INVENTION

Figure 1:
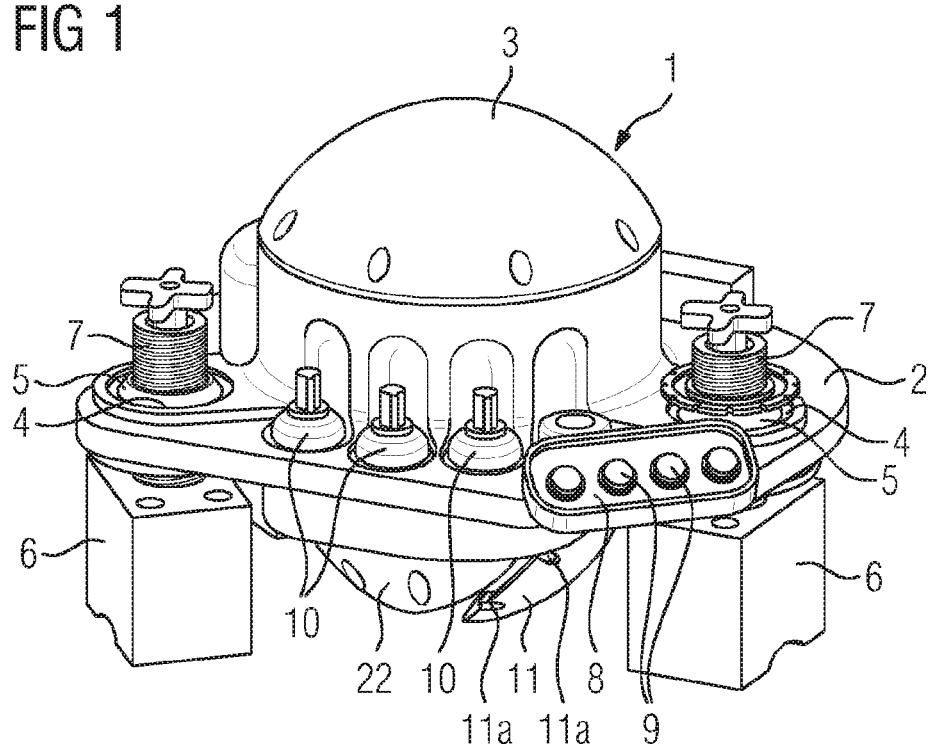
FIG. 1 is a perspective view of a first embodiment of a device according to the invention obliquely from above in a schematic illustration.
Figure 2:
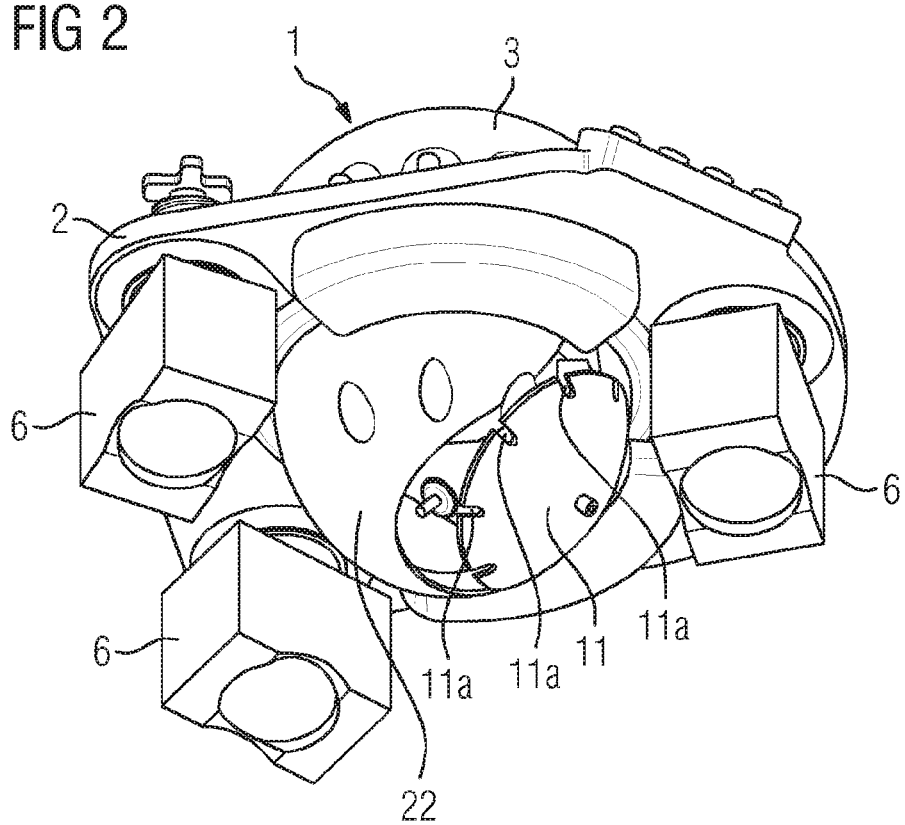
FIG. 2 is a perspective view of the device from FIG. 1 obliquely from below in a schematic illustration.
Figure 3:
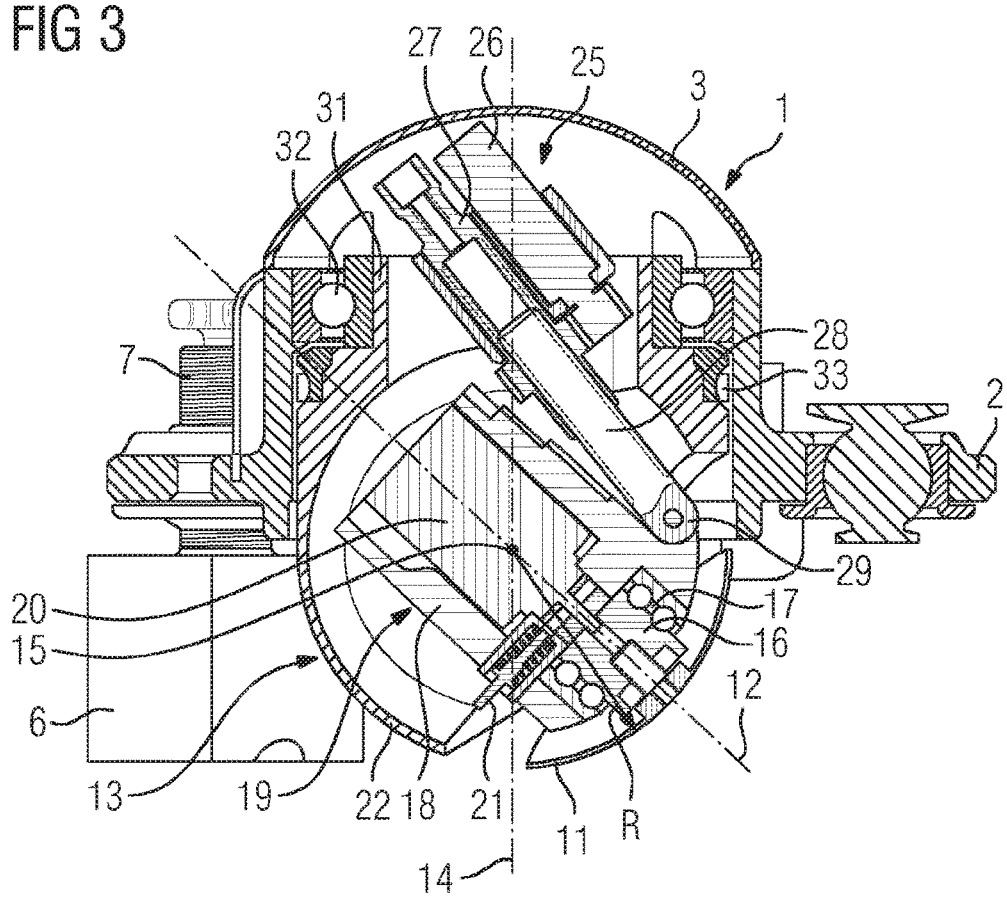
FIG. 3 is a partially sectioned perspective view of the device from FIG. 1 in a schematic illustration.

FIGS. 1 and 2 show perspective external views of a first exemplary embodiment of a device according to the invention for taking a sample from a solid body by cutting out in a schematic illustration, respectively obliquely from above and obliquely from below. In FIG. 3, the device is shown schematically in a partially sectioned illustration, wherein the inner workings of the device can be seen.

The device according to the invention comprises a housing 1, simultaneously serving as a frame, which has been obtained by carrying out a rapid prototyping method, in practical terms by 3-D printing, and is made of plastic. The housing 1 comprises an at least substantially plate-shaped housing section 2 and a dome-shaped housing section 3 adjoining the latter at the top, which encompasses components of the device, which will be discussed in more detail, located underneath. Provided in the plate-shaped housing section 2 are three recesses 4, in each of which is arranged a radial joint bearing 5, by which means in total three feet 6 (cf. in particular FIG. 2) of the device are fixed in an articulated manner to the housing 1. Each foot 6 comprises a magnet which can be switched on and off, so that a temporary, reliable fixing of the device to solid bodies of ferromagnetic material is quickly and conveniently possible. Each foot 6 is held on the housing 1 via a threaded rod 7 extending through the respective radial joint bearing 5. By rotating the threaded rods 7, the feet 6 can be screwed in and out, and thus the height of the housing 1 in relation to the surface of a solid body from which a sample is to be taken can be varied.

Likewise easy to see in FIG. 1 is an operating panel 8 molded onto the outer side of the housing 1, in practical terms the plate-shaped housing section 2, and having buttons 9, via which the device can be operated manually. On the left-hand side of the operating panel 8 there are also three potentiometers 10 for drives of the device, which will be discussed further below.

Figure 4:
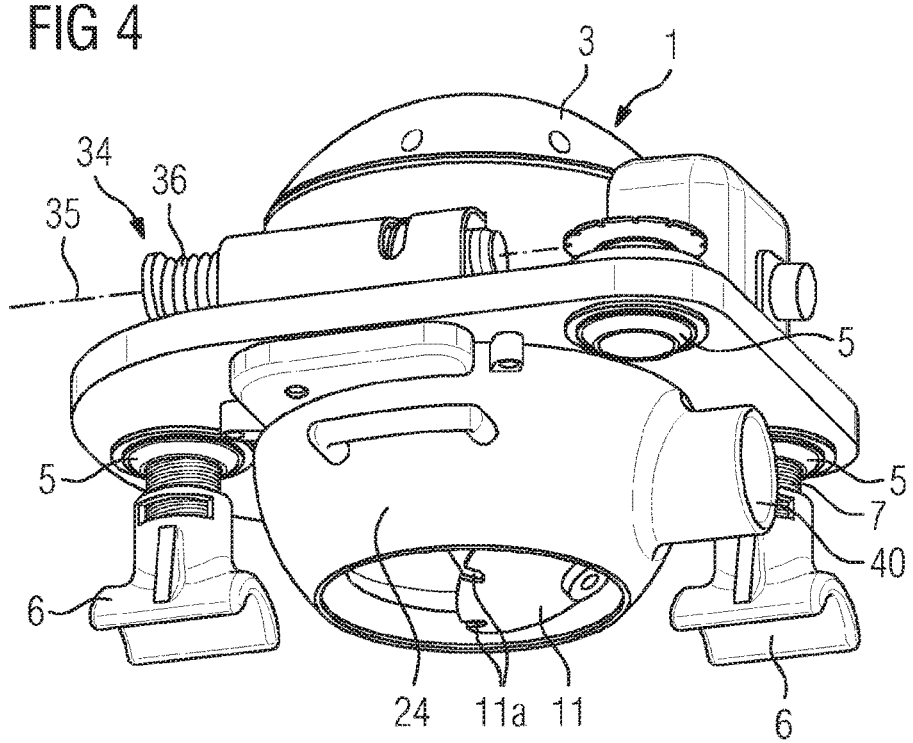
FIG. 4 is a perspective view of a second embodiment of the device according to the invention obliquely from below in a schematic illustration.

In order to be able to take a sample from a solid body by cutting out, the device comprises a cutting tool 11 arranged on its underside, which, at least substantially has the shape of a hollow spherical segment. The hollow spherical segment-shaped cutting tool 11 can be seen particularly well from FIGS. 2, 3, 9 and 11. The cutting tool 11 has a multiplicity of U-shaped recesses 11a, which are distributed along its outer circumference and which are spaced apart equidistantly from one another and which extend radially inwards from the outer circumference. The recesses 11a, which are not illustrated in all the figures but can be seen in particular in FIGS. 1, 2 and 4, are used, amongst other things, for improved chip evacuation during a cutting operation. The cutting tool 11 is coated with cubic boron nitride (CBN), in particular to increase the resistance to wear.

The cutting tool 11 is mounted such that it can rotate about a tool axis of rotation 12 (cf. FIG. 3), specifically on a holding body 13 of the device, which, in turn, is rotatably mounted on the frame 1 in order to carry out a feed movement of the cutting tool 11 about a feed axis 14 that is stationary in relation to the housing 1 (cf. in particular FIG. 3). The cutting tool 11 is further held on the holding body 13 such that it can be pivoted about a stroke axis 15 which, in FIG. 3, is perpendicular to the plane of the drawing. The tool axis of rotation 12, feed axis 14 and stroke axis 15 intersect at the spherical centre belonging to the hollow spherical segment-shaped cutting tool 11. The cutting tool 11 is movable on a spherical surface, the radius of which corresponds to the outer spherical radius R belonging to the hollow spherical segment-shaped cutting tool 11. The radius R can be taken from FIG. 3 and FIG. 9, which shows an enlarged central section of the cutting tool 11. In the exemplary embodiment illustrated, the spherical radius is 69 mm. The comparatively large radius makes it possible to take a sample with a comparatively small cross section from a solid body, and the cut surface that is produced has only an extremely low notch sharpness.

In design terms, the possible movements of the cutting tool 11 are implemented as follows:

The cutting tool 11 is co-rotationally fixed to a spindle 16 used as a tool holder, which is held via bearings 17 such that it can rotate about the tool rotational axis 12 on a rotary drive housing 18 of a rotary drive unit 19 provided for the rotation of the cutting tool 11 about the tool axis of rotation 12. The rotary drive unit 19 comprises a brushless DC motor 20, via which the spindle 16 carrying the cutting tool 11 can be driven. In order to be able to ensure that the spindle 16, and thus the cutting tool 11, does not rotate unintentionally when the device is not being used, a spindle lock 21 is provided.

Figure 5:
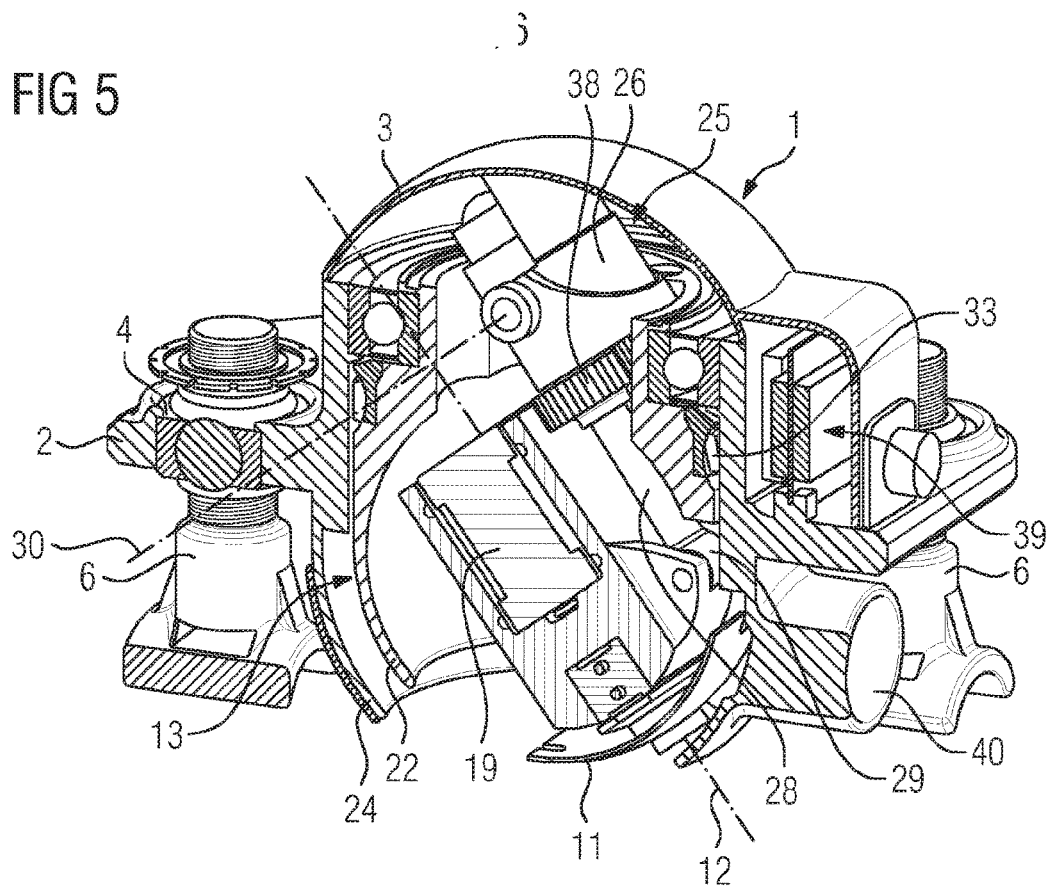
FIG. 5 is a partially sectioned perspective view of the device from FIG. 4 in a schematic illustration.
Figure 6:
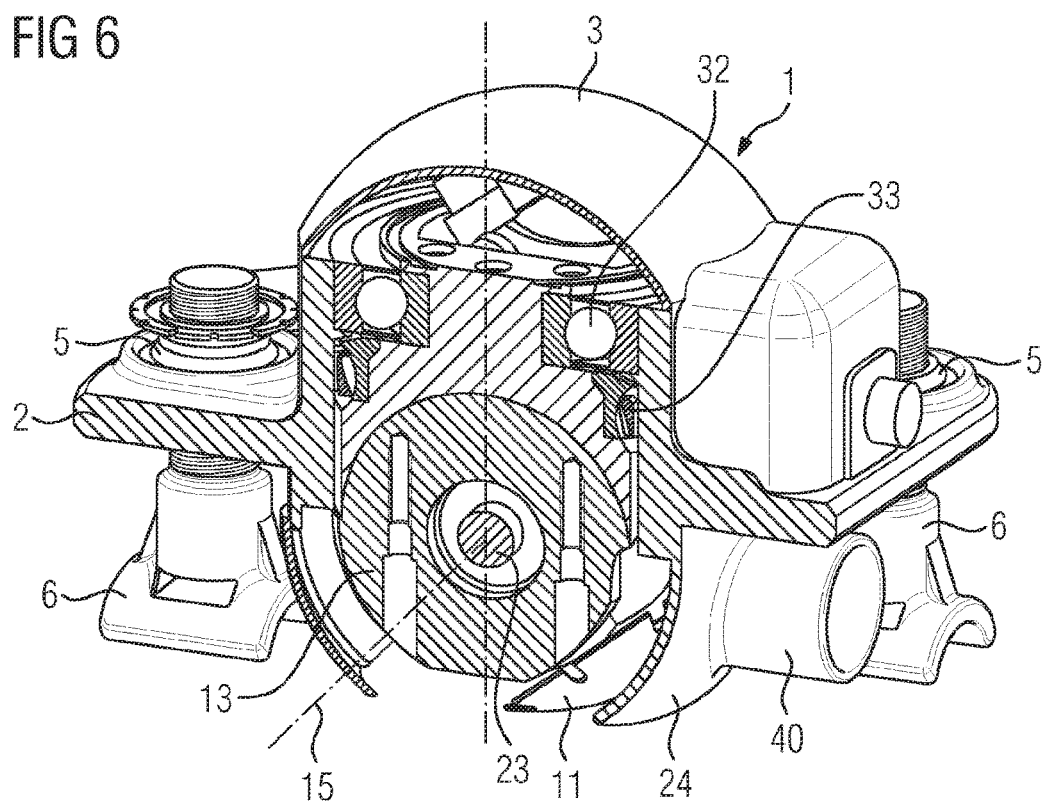
FIG. 6 is a further partially sectioned perspective view of the device from FIG. 4 in a schematic illustration.

For the pivoting movement of the cutting tool 11 about the stroke axis 15, the rotary drive housing 18 is mounted on the holding body 13 such that it can pivot about the stroke axis 15 (cf. also FIG. 6). The holding body 13 comprises an at least substantially spherical segment-shaped receiving section 22, within which the rotary drive housing 18 extends, and on which it is pivotably mounted, in practical terms at two points of the inner wall. One of the two associated pivot bearings 23 can be seen from FIG. 6, which shows a section at a corresponding position. It should be noted that although FIGS. 4 to 6 do indeed show a second embodiment of a device according to the invention which, amongst other things, has an additional lower housing section 24 to encapsulate the machining region. However, since the pivotable mounting of the cutting tool 11 about the stroke axis 15 is implemented in the same way in the second embodiment, reference can be made to this figure. The same components are provided with the same designations therein.

In order to be able to effect motorized pivoting of the cutting tool 11 about the stroke axis 15, a stroke drive unit 25 that can be seen in FIG. 3 and has a linear drive comprising a stepping motor 26 is provided. By means of the stepping motor 26, a threaded sleeve 27 of the stroke drive unit 25 can be set rotating, which in turn leads to a threaded rod 28 received by the latter, the front end 29 of which is connected in an articulated manner to the rotary drive housing 18 (cf. FIG. 5), being moved out of or into the threaded sleeve 27, which results in pivoting of the rotary drive housing 18 and thus of the cutting tool 11 about the stroke axis 15. The stepping motor 26, the threaded sleeve 27 and threaded rod 28 are mounted such that they can pivot on the holding body 13, in practical terms about a pivot axis 30 that is parallel to the stroke axis 15 (cf. FIG. 5), so that the components can follow the pivoting movement of the rotary drive housing 18 and thus of the cutting tool 11.

For the implementation of a feed movement of the cutting tool 11, the holding body 13, as mentioned, is mounted on the frame such that it can rotate about a feed axis 14 that is stationary in relation to the housing 1 (FIG. 3). For this purpose, the holding body 13 has an upper at least substantially cylindrical drive section 31, which is rotatably held on the housing 1 about its central cylinder axis that coincides with the feed axis 14, in practical terms within the dome-shaped housing section 3, for which purpose a bearing 32 is provided (cf. FIGS. 2, 5 and 6). The drive section 31 is provided with teeth 33 on the outside and forms the "worm gear" of a worm gear mechanism of a feed drive unit 34 of the device. The feed drive unit 34 has a worm 36 in the form of a threaded rod which is mounted on the housing 1 such that it can rotate about a worm axis of rotation 35 and can be motor-driven by means of a stepping motor, not visible in the figures, and which meshes with teeth 33 on the drive section 31. If the worm 36 is rotated in one or the other direction about its longitudinal axis, this results in a rotation of the holding body 13 about the feed axis 14 in one or the other direction of rotation, and thus in a feed movement of the cutting tool 11 in the circumferential direction. It should be noted that the feed lines, not illustrated in the figures, to the then co-rotating motors 19 and 26 from the rotary drive unit 19 and the stroke drive unit 25 do not comprise wiping contacts in the exemplary embodiment illustrated; the holding body 13 is always rotated at most through 360° in one direction of rotation about the feed axis 14, and then the direction of rotation is reversed.

The motors of the three drive units 19, 25, 34, can be actuated by a user via the buttons 9 on the operating panel 8 (for example on/off and/or forward/back). The respective speed of rotation can be varied via the potentiometers 10.

The motors of all three drive units 19, 25, 34 meet the requirements of protective class III according to DIN EN 61140; it is therefore a drive with a protective extra-low voltage. In the present case, all three motors are stepping motors. Encoders for the detection of the current position of the cutting tool 11 are accordingly not required but can additionally be provided.

For the rotary drive unit 19 in the exemplary embodiment illustrated, the power supply for the motor 20 is 24 V/3.5 A, the torque is about 0.4 Nm, and the speed control is advantageously about 4000 l/min. For the motor 26 of the stroke drive unit 25, the holding torque is about 0.35 Nm and the torque is about 2.00 Nm. A positioning accuracy <=1° can be achieved. For the motor of the feed drive unit 34, the holding torque is about 0.35 Nm and the torque is about 2.00 Nm. Here, a positioning accuracy <=1° can also be achieved.

The device further comprises at least one camera, which cannot be seen in the figures, via which the taking of a sample can be observed and recorded, even from a distance.

The second embodiment of a device according to the invention, illustrated in FIGS. 4 to 6, differs from the first firstly in the fact that it has an additional housing section 24, has different feet 6 which do not have magnets but recesses 37 for tension belts, not illustrated, and it has a somewhat differently configured stroke drive unit 25. The latter comprises a gear wheel 38, which is driven by the motor 26 and which has an internal thread, not visible in the figures. Said internal thread virtually performs the function of the threaded rod 28 from the drive of the first embodiment. The rod 28 has an external thread—only in the upper section—and is moved out and moved in in a way analogous to the rod 28 of the first embodiment when the gear wheel 38 is driven by the motor 26.

A further difference of the second embodiment consists in the fact that no operating panel 8 for manual operation is provided. Instead, the device comprises a central control unit 39 having a microprocessor, which is connected to the three drive units 19, 25, 34 and which is designed and configured to take a sample completely automatically.

Also provided are sensors, not illustrated in the figures, for monitoring a sample-taking process. In practical terms, these are a sensor for temperature measurement, a sensor for detecting the emission of sound and sensors for detecting the current consumption and/or rotational speed of the motors of the three drive units 19, 25, 34. The sensors are all connected to the control unit, and measured values which are acquired by the sensors during operation are transmitted to the control unit 39, which, on the basis of these, controls the respective sample-taking process in an optimized manner.

Finally, the device from FIGS. 4 to 6 can be connected particularly simply to a suction unit, not illustrated in the figures, specifically via the suction connection 40, which projects laterally from the housing section 24 enclosing the machining region.

Figure 7:
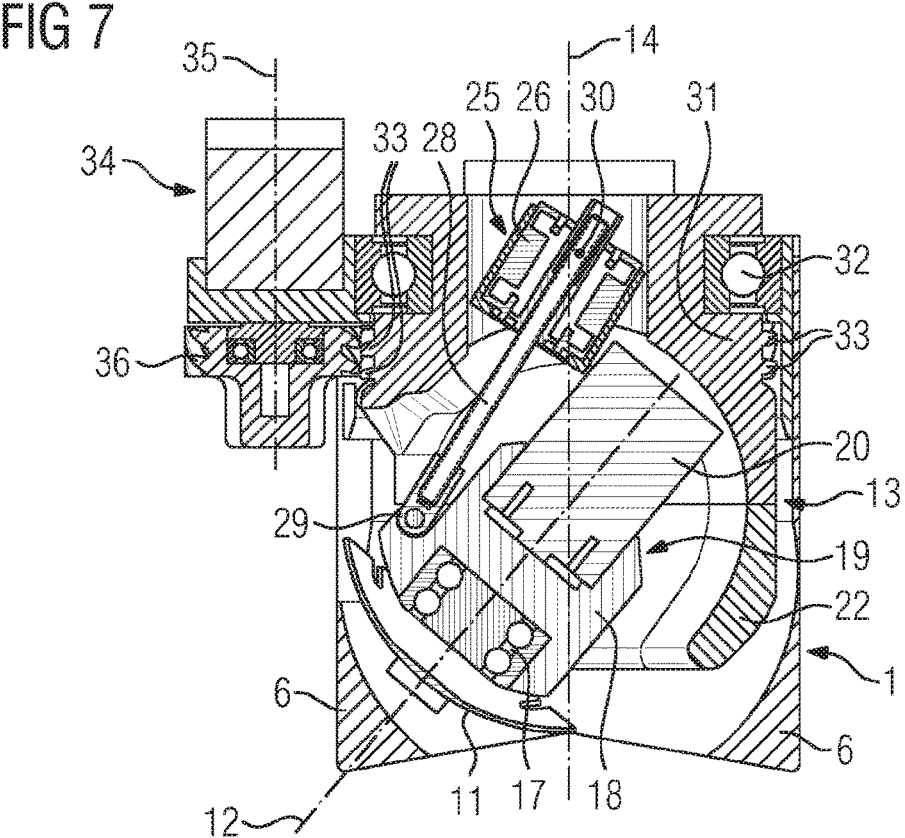
FIG. 7 is a partially sectioned perspective view of a third embodiment of the device according to the invention from the side in a schematic illustration.
Figure 8:
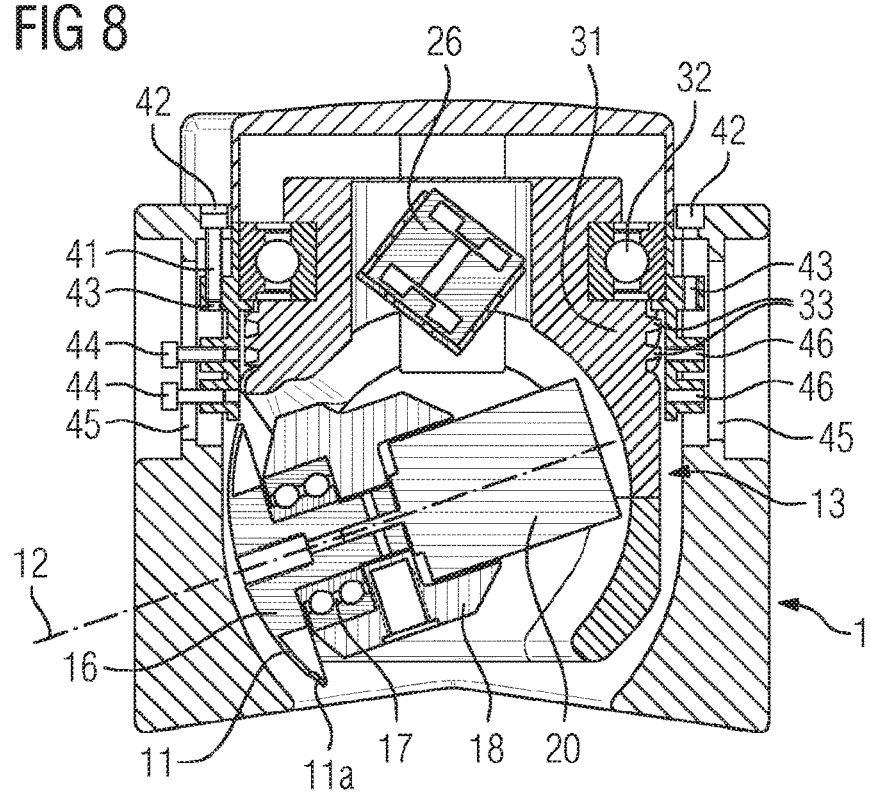
FIG. 8 is a further partially sectioned perspective view of the device from FIG. 7.

FIGS. 7 and 8 show a third embodiment of a device according to the invention in perspective, partly sectioned illustrations. In particular, the third embodiment differs from the first and second by a considerably different, more compact housing shape. In practical terms, the housing 1 of this device is shaped rather more like a cube or die, and four feet 6 are molded directly onto the underside of the latter, in the four corners of the housing 1. The housing 1 is temporarily fixed to a solid body at a desired position by means of tension belts, not illustrated in the figures, for which purpose the housing 1 has guides, not visible in the figures, for the tension belts. A further difference consists in the fact that the worm axis of rotation 35, around which the worm 36 of the feed drive unit 34 can be rotated, is not oriented horizontally here but vertically. Since the feet 6 in this embodiment are part of the housing 1 and not vertically adjustable, the holding body 13 is also vertically adjustably mounted on the housing 1, in practical terms can be moved linearly forward and back along the feed axis 14, in order to change the height and thus the distance of the cutting tool 11 from the surface of a solid body on which the device is arranged.

Finally, since vertical adjustment of the cutting tool 11 via the feet 6 is not possible here, the holding body 13 is vertically adjustably mounted on the housing 1, as can be gathered from the sectional illustration from FIG. 8. In practical terms, the holding body is held on the housing 1 by height adjustment screws 41, of which only one is shown by way of example in FIG. 8. The height adjustment screws 41 are supported in a screw receiving region 42 on the housing 1 and are each screwed into a thread 43 on the holding body 13. By actuating the height adjustment screws 41, the height of the holding body 13 and thus of the cutting tool 11 with respect to the sub-base can be changed. In order to lock a desired vertical position, fixing screws 44 are additionally provided, each of which extends through a slot 45 in the housing 1 and is screwed into a thread 46 in the holding body 13. Of the fixing screws 44, only two can be seen in FIG. 8.

For all three of the embodiments described above, the respective device is provided for taking a sample from a solid body, for example, a housing of a turbine, and is arranged at the desired position on the solid body and is temporarily fixed to the solid body by means of the magnetic feet 6 and/or by means of one or more tension belts, not shown in the figures. Then, by means of the cutting tool 11, a sample is cut out of the solid body, a cut having a spherical-segment-shaped contour being produced in the solid body.

Figure 9:
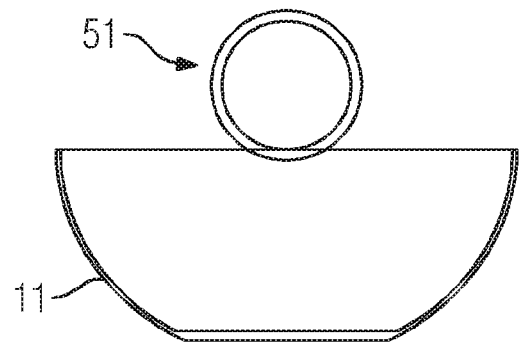
FIG. 9 is the cutting tool of the devices from FIGS. 1, 4 and 7 in horizontal section, together with a sample-taking point in a schematic illustration.
Figure 11:
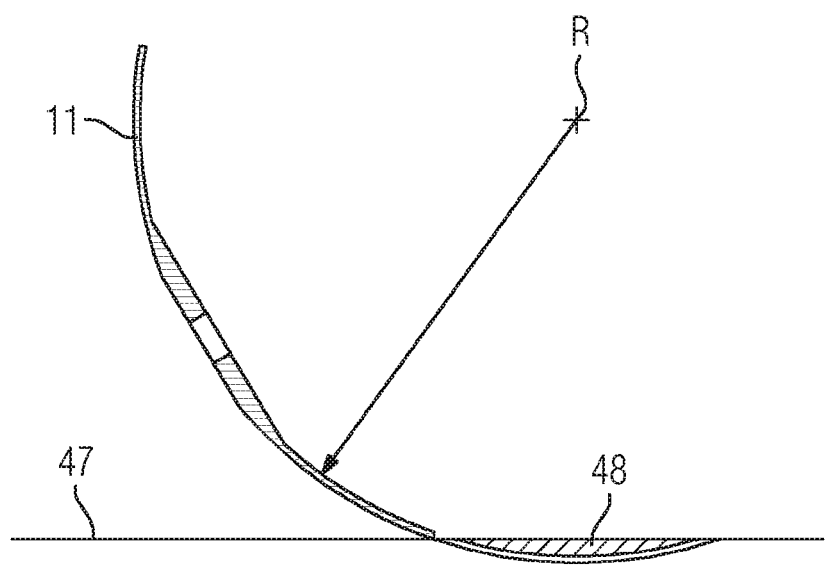
FIG. 11 is the cutting tool from FIG. 9 in vertical section, together with a sample-taking point in a schematic illustration.

This is illustrated in FIGS. 9 and 11—purely schematically in each case—in which the sample 48 cut out of the solid body 47 and the cutting region 49 are sketched.

By using the device according to the invention and carrying out the method according to the invention, samples 48 can be taken simply and rapidly from, for example, metallic solid bodies 47 wherein, because of the special form of the cutting tool 11, structural changes, for example as a consequence of thermal action, can be avoided or kept to a minimum.

As a result of the two-axis feed movement on a spherical surface (movement about feed axis 14 and stroke axis 15), in particular a constant chip volume can be maintained over the entire sample cross section with a virtually negligible input of heat into the sample 47. The input of heat is so low that cooling during the cutting operation is not absolutely necessary. Of course, the device according to the invention can, however, comprise means for cooling, for example means for supplying a cooling medium, in order to be able to carry out preventative cooling.

It is possible to obtain representative solid body samples 48 which are particularly suitable for further analysis and condition determination.

Figure 12:
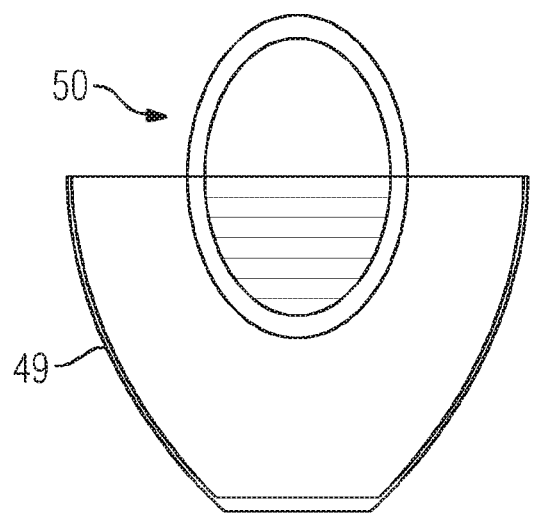
FIG. 12 is an elliptical cutting tool in horizontal section, together with a sample-taking point in a linear machining direction in a schematic illustration.

By using a hollow spherical segment-shaped or else hollow spherical disc-shaped cutting tool 11 or a cutting tool at least having a section of such a shape which can be moved along a spherical surface, it is possible, as the applicant has established, for in particular considerably more suitable samples 48 to be taken from a solid body 47 than is the case with a cup-shaped cutting tool 49 (cf. FIG. 12) which is driven into a solid body 47 with an only single-axis linear feed movement, in practical terms is mounted such that it can be pivoted only about one pivot axis, by which means an elliptical cutting region 50 is obtained, as indicated purely schematically in FIG. 12. During this procedure, the cutting tool 49 must penetrate considerably more deeply into the solid body 47, and the cutting width increases rather than decreases towards the sample centre, as in the solution according to the invention, as also illustrated schematically in FIG. 9, in which the cut region 51 produced with the cutting tool 11 is illustrated as being subdivided in those annular sections which, starting from outside, can be cut one after another, in each case after changing the stroke. Of course, as an alternative, the stroke can also be adapted continuously at the same time as the feed movement, which would result in a spiral cut profile.

Figure 10:
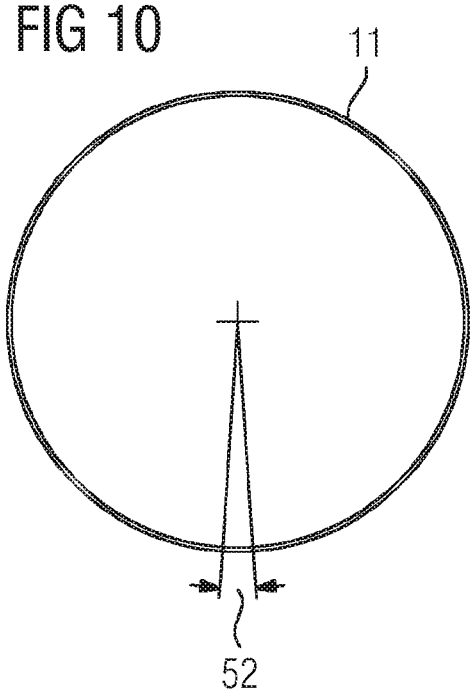
FIG. 10 shows a schematic illustration of a front view of the cutting tool from FIG. 9, wherein the region coming into engagement with a solid body to take a sample is marked.
Figure 13:
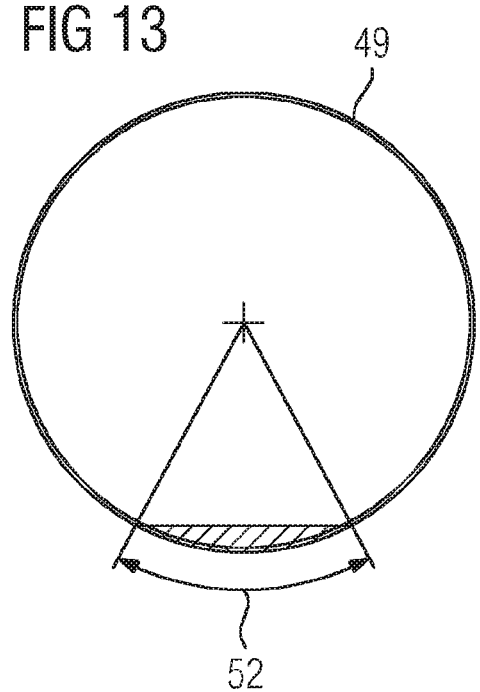
FIG. 13 is a schematic illustration of a front view of the cutting tool from FIG. 12, wherein the region coming into engagement with a solid body to take a sample is marked.

A further advantage of the solution according to the invention is that the region over which the cutting tool 11 comes into engagement with the solid body 47 is considerably smaller. Whereas, with the cup-shaped cutting tool 49 and single-axis feed movement, about 15% of the cutting tool 49 comes into engagement, in the hollow spherical segment-shaped cutting tool 11 according to the present invention it is only about 2%. The engagement region 52 is indicated in FIGS. 10 and 13, schematically in each case. The angle associated with the engagement region 52 is always about 56° in FIG. 13 and about 8° in FIG. 8.

Although the invention has been illustrated and described in more detail via the exemplary embodiment, the invention is not restricted by the examples disclosed, and other variations can be derived therefrom by those skilled in the art without departing from the protective scope of the invention.

The invention claimed is:

1. A device for taking a sample from a solid body by cutting out, comprising:
   a frame and a cutting tool held on the frame in such a way that that cutting tool can be moved relative to the frame,
   wherein the cutting tool, has a spherical cutting contour, the cutting tool is mounted such that it can rotate about a tool axis of rotation, the cutting tool can translate along at least two axes, and the tool axis of rotation and the at least two axes intersect at a spherical center of the spherical cutting contour.

2. The device as claimed in claim 1,
   wherein the tool axis of rotation coincides with that axis which is rotationally symmetrical in relation to that of the spherical cutting contour of the cutting tool.

3. The device as claimed in claim 2,
   wherein the arrangement is made in such a way that the position of the tool axis of rotation relative to the frame can be varied.

4. The device as claimed in claim 3,
   wherein the arrangement is made in such a way that the cutting tool is moveable on a spherical surface, the radius of which corresponds to a spherical radius that belongs to the spherical cutting contour of the cutting tool.

5. The device as claimed in claim 1,
   wherein the cutting tool can translate along the spherical cutting contour via a feed movement about a feed axis that is stationary in relation to the frame, a stroke movement about a stroke axis which is orthogonal to the feed movement, and the cutting tool is height-adjustably mounted on the frame to set a depth of the spherical cutting contour in the solid body.

6. The device as claimed in claim 5,
   wherein the feed axis and the stroke axis intersect at the spherical centre belonging to the spherical cutting contour of the cutting tool.

7. The device as claimed in claim 5, further comprising:
   a feed drive unit for the rotational movement of the cutting tool about the feed axis, and
   a stroke drive unit for a pivoting movement of the cutting tool about the stroke axis.

8. The device as claimed in claim 7,
   wherein the feed drive unit comprises a stepping motor and a worm gear mechanism.

9. The device as claimed in claim 7,
   wherein the stroke drive unit comprises a linear drive comprising a stepping motor and a planetary gear mechanism,
   wherein the stroke drive unit comprises an actuating element which is moveable in and out linearly, which is connected in an articulated manner to a tool holder carrying the cutting tool, and the actuating element is mounted such that it can pivot about a stroke drive pivot axis.

10. The device as claimed in claim 5,
    wherein the cutting device is movably held on a holding element,
    wherein, in order to implement the feed movement about the feed axis, the holding body is rotatably mounted on the frame, and the cutting tool is mounted on the holding body so as to be pivotable about the stroke axis, and the holding body is vertically adjustably mounted on the frame.

11. The device as claimed in claim 10,
    wherein the holding body has an at least substantially cylindrical drive section, which is mounted on the frame so as to be rotatable about its central longitudinal axis, and is provided with teeth on the outside, some of which mesh with a motor-driven worm mounted on the housing so as to be rotatable about its longitudinal axis, and
    wherein the holding body comprises a receiving section, which is at least partly distinguished by a spherical outer and inner contour and in which a tool holder carrying the cutting tool and a drive for the rotational movement of the cutting tool about the tool axis of rotation is arranged,
    wherein the receiving section has an opening and the cutting tool is arranged in the region of the opening.

12. The device as claimed in claim 1,
    wherein for the rotational movement of the cutting tool about the tool axis of rotation, a rotary drive unit having a brushless DC motor is provided.

13. The device as claimed in claim 1,
    wherein to temporarily fix the device to a solid body from which a sample is to be taken, feet are provided,
    wherein the feet are connected to the frame, and the feet are fixed to the frame so as to be rotatable in and out for vertical adjustment.

14. The device as claimed in claim 13,
    wherein the feet comprise magnets that are switchable on and off and receptacles for tension belts,
    wherein the feet are connected to the frame in an articulated manner, via radial joint bearings, and the feet are fixed to the frame so as to be rotatable in and out for vertical adjustment.

15. The device as claimed in claim 1, further comprising:
    a housing that is open on one side and
    a suction unit.

16. The device as claimed in claim 1, further comprising:
    a control unit, which is connected to a drive for the rotational movement of the cutting tool about the tool axis of rotation and a drive for the pivoting movement of the cutting tool about the stroke axis and a drive for the rotational movement of the holding body about the feed axis.

17. The device as claimed in claim 16,
    wherein the control unit is designed and configured to cut out a sample automatically from a solid body.

18. The device as claimed in claim 16, wherein the control unit comprises at least one microprocessor.

19. The device as claimed in claim 1, further comprising:
at least one encoder, which is designed and arranged to detect the current position of the cutting tool, and
at least one sensor, which is designed and arranged to monitor the external temperature or the condition of a drive that is present, and
at least one camera, which is designed and arranged to be able to record the taking of a sample.

20. A method for taking a sample from a solid body by cutting out, the method comprising:
providing a device as claimed in claim 1,
arranging the device at a suitable point of the solid body which is temporarily fixed, and taking a sample by means of the cutting tool from the solid body, wherein a cut having a spherical segment-shaped contour is produced in the solid body.

* * * * *